United States Patent
Sulyman

Patent Number: 5,862,629
Date of Patent: Jan. 26, 1999

[54] SOIL RETAINER FOR HILLSIDE PLANTING

[76] Inventor: Ziyad A. Sulyman, 67 Via Floreado, Orinda, Calif. 94549

[21] Appl. No.: 911,128
[22] Filed: Aug. 14, 1997
[51] Int. Cl.$^6$ .................................................. A01G 17/04
[52] U.S. Cl. .................................... 47/66.1; 47/83; 47/33
[58] Field of Search ..................................... 47/66.1, 66.3, 47/66.4, 23, 24, 25, 33; 52/169.4, 169.7, 102; 405/38, 276, 279

[56] References Cited

U.S. PATENT DOCUMENTS

| 348,598 | 9/1886 | Strickland | 52/102 |
|---|---|---|---|
| 696,792 | 4/1902 | Bedell | 52/102 X |
| 1,015,584 | 1/1912 | Powell | 52/102 |
| 1,500,917 | 7/1924 | Bell | 47/66.1 X |
| 2,061,631 | 11/1936 | Law | 47/33 X |
| 4,809,460 | 3/1989 | Futch et al. | 47/33 |
| 4,847,741 | 7/1989 | Boettinger | 47/66.1 X |

Primary Examiner—Michael J. Carone
Assistant Examiner—Yvonne Abbott
Attorney, Agent, or Firm—Julian Caplan; Flehr Hohbach Test; Albritton & Herbert LLP

[57] ABSTRACT

One form of the invention employs two each of two different flexible parts to provide a soil retainer for plants on a hillside. Each part has one straight edge, an opposed slanted edge, a first side having a first pattern of hinge knuckles and a second side having a second pattern of hinge knuckles. The slanted edges are reversed in direction in the different flexible parts and their hinge knuckles are complementary. A first pair of two different parts is assembled by fitting their first hinge knuckles together and a second pair of parts is similarly assembled. The second pattern of hinge knuckles of the two pairs of parts are assembled. Long, staple-like pins fit through the holes of assembled knuckles and are driven into the soil. The retainer extends higher on the uphill side and lower on the downhill side. To increase the circumference of the retainer third parts may be inserted between the parts of one or both pairs. Instead of using knuckles and hinge pins, the parts may be formed with holes, the holes overlapped, apertured connectors inserted through the holes and the combination assembled by inserting a pin through the apertures and into the ground.

15 Claims, 8 Drawing Sheets

SOIL RETAINER FOR HILLSIDE PLANTING

BACKGROUND OF THE INVENTION

1. Field of the Invention

This invention relates to a new and improved soil retainer for hillside planting. More particularly the invention relates to use of a plurality of flexible parts which are wider at one end than at the other. Four or more such parts, two of each type, may be fitted together so that the assembly has an apex at the uphill side of a planting area and a downward extending portion at the downhill portion of the hillside.

2. Description of Related Art

Heretofore small retaining walls have been assembled from flexible plastic members. These walls are not securely anchored and frequently are only of cylindrical shape so that the wall is of equal height relative to the sloping ground in all directions. Anchoring and joining devices are unreliable and the devices are difficult to install.

U.S. Pat. No. 4,809,460 illustrates an elongated flexible member which is curved into an arcuate shape and attached to the downhill side of a planting. However, no provision is made to retain soil on the uphill side. The manner of anchoring the member to the soil is complex.

SUMMARY OF THE INVENTION

Flat, preformed parts are shaped to conform to an intersection of a round container to a slope and are assembled with abutting edges extending in proper direction for the uphill slope and the downhill slope to provide a retainer to hold soil surrounding a planting flat. The uphill face is higher than the soil surface of the planting to hold back the earth uphill while the forward face is lower than the soil surface to prevent the soil within the device from running off.

The parts may be fabricated of plastic which is readily molded in simple shapes and die cut to the appropriate geometry. In one form of the invention, the adjacent parts are joined together with staple-like pins which interfit through holes molded into the edges of the parts and into the ground to anchor the device.

Additional parts may be used in the assembly to increase the circumference of the device in order to accommodate larger plants.

In one embodiment of the invention the abutting edges of the parts are formed with interfitting knuckles similar to those of leaf hinges. In another form of the invention the connecting devices are generally similar to the rounded knuckles of leaf hinges but are formed in rectangular shapes, the connecting pin or staple being generally rectangular in cross-section.

In still another form of the invention the abutting edges are formed with holes, such as vertically elongated rectangular openings. Separate connecting elements which are apertured are fitted through the overlapping holes of adjacent parts to hold the parts assembled and pins fit through the apertures in the connectors and are driven into the ground to hold the parts together and anchor the device.

Another modification incorporates the connecting elements of the preceding modification in one of the parts. The connecting element of one part is inserted through the hole in the adjacent part and a pin fits through a hole in the connecting part and is driven into the ground.

BRIEF DESCRIPTION OF THE DRAWINGS

The accompanying drawings, which are incorporated in and form a part of this specification, illustrate embodiments of the invention and, together with the description serve to explain the principles of the invention.

DESCRIPTION OF PREFERRED EMBODIMENTS

Reference will now be made in detail to the preferred embodiment of the invention, examples of which are illustrated in the accompanying drawings. While the invention will be described in conjunction with the preferred embodiment, it will be understood that they are not intended to limit the invention to those embodiment. On the contrary, the invention is intended to cover alternatives, modifications and equivalents, which may be included within the spirit and scope of the invention as defined by the appended claims.

Figure 1:
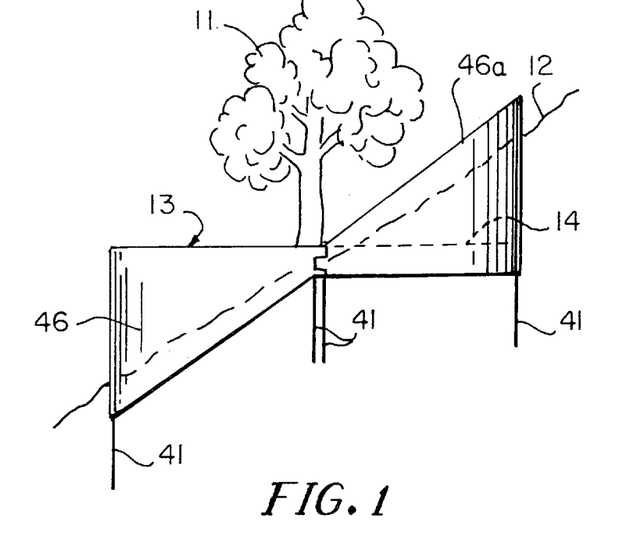
FIG. 1 is an enlarged schematic view showing a device in accordance with the present invention protecting a planting on a sloping area such as a hillside.

The present invention is intended for use with a plant 11 which is to be planted on a slope 12 such as a hillside. The device 13 which is the subject of this invention protects the plant 11 by preventing soil from the uphill area of slope 12 covering the plant 11 and also preventing the soil on the downhill side of the slope 12 from washing away from the roots of the plant 11. Accordingly soil at a fairly consistent level 14 within the device 13 may be established and maintained.

Figure 2:
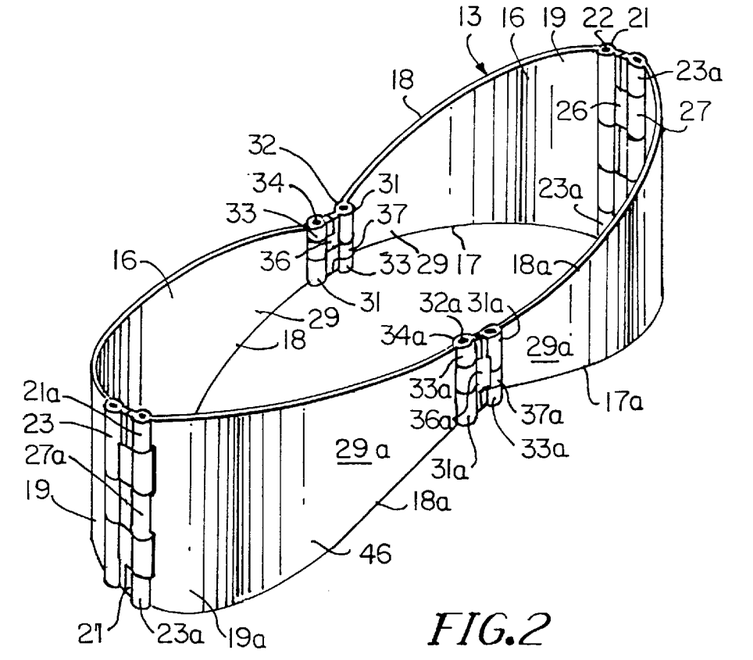
FIG. 2 is a perspective view showing the parts of the device of FIG. 1 assembled.

Device 13 is made up of a least two pairs of flexible, initially flat pieces preferably of plastic. The pieces may be bent into arcuate shapes and the abutting edges interconnected in such manner that the device 13 has a high side on the uphill slope 12 and a low side on the downhill side, the low side being partially beneath the surface of the slope. Thereupon the plant may be installed within the device 13 and soil added to level 14. As hereinafter appears, there are several different ways disclosed in this application for interconnecting the abutting sides and additional modifications will occur to one skilled in this art.

Figure 3:
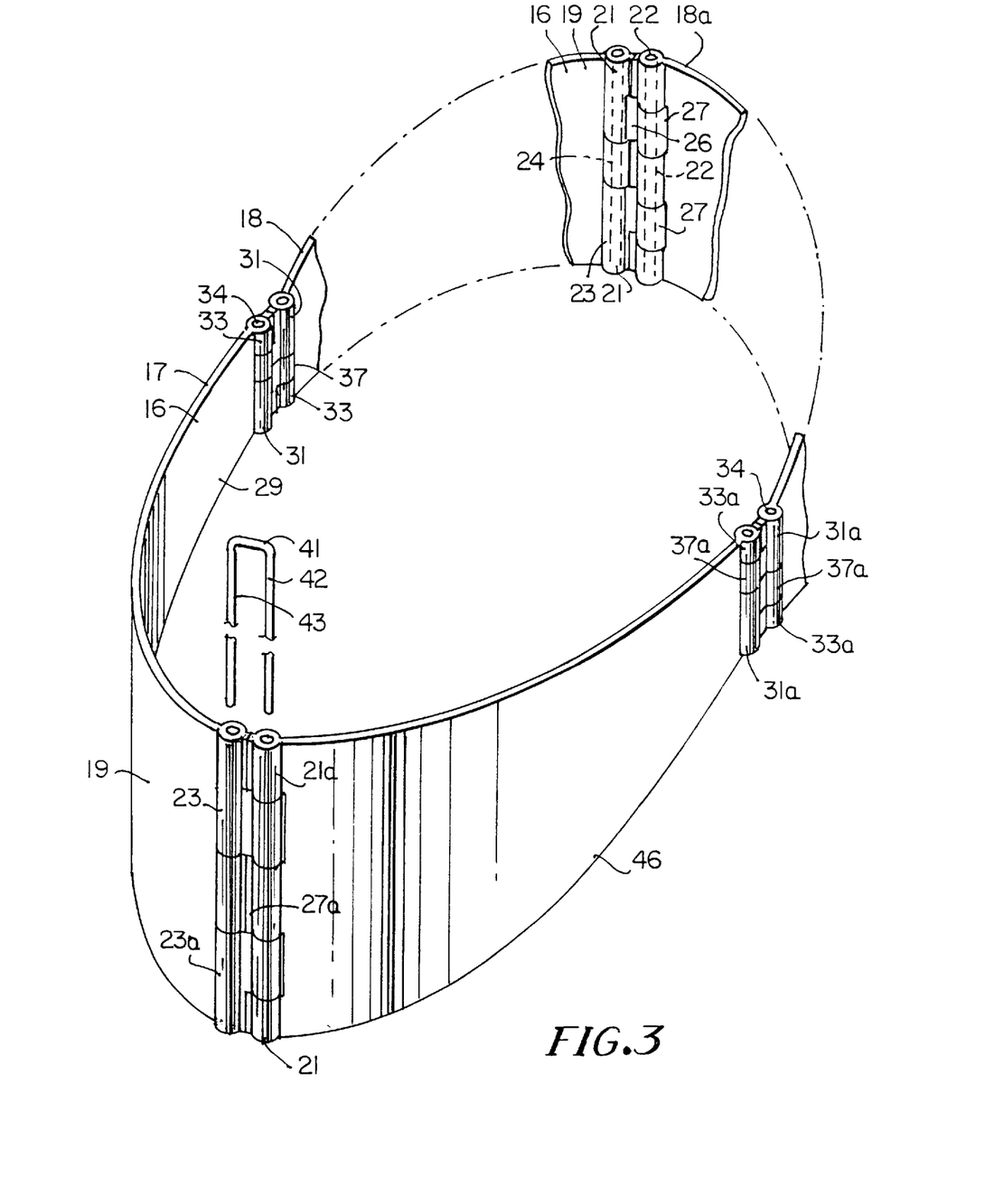
FIG. 3 is an enlarged fragmentary view of a portion of the structure of FIG. 2 prior to final assembly.
Figure 4:
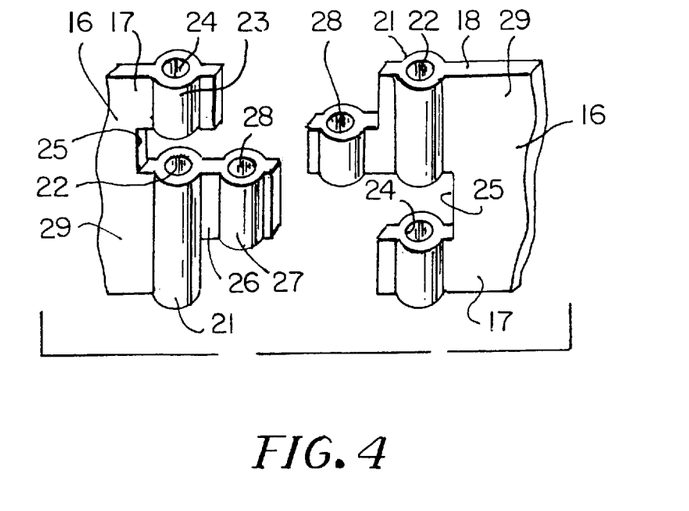
FIG. 4 is an enlarged fragmentary view of a portion of the structure of FIG. 3 prior to assembly.
Figure 5:
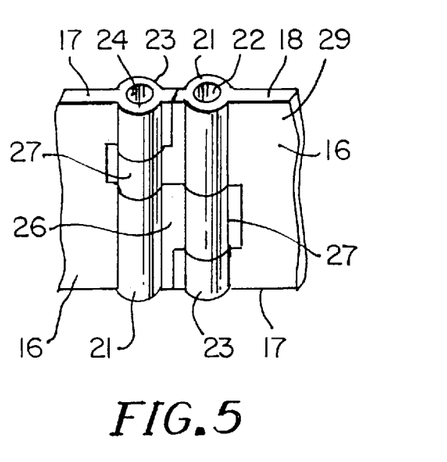
FIG. 5 is a view similar to FIG. 4 showing parts assembled.
Figure 6:
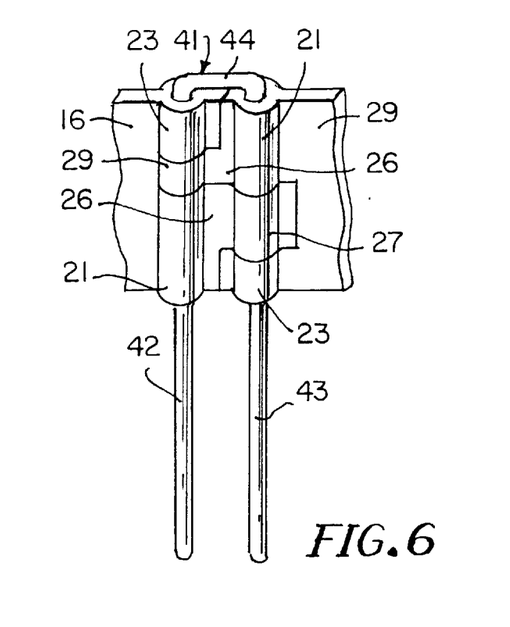
FIG. 6 is a view similar to FIG. 5 showing staples driven through holes in the knuckles.

First-shaped piece 16 of a pair of pieces has a straight longitudinal edge 17 and a slanted or sloping longitudinal edge 18. At a first end 19 the edges 17 and 18 are farthest apart whereas at a second end 29 the edges 17 and 18 are closest together. At first end 19 the piece 16 is formed with a first knuckle 21 similar to the knuckle of a leaf hinge. Hole 22 extends from top to bottom of knuckle 21. At the bottom of end 19 is a second knuckle 23 having a hole 24 aligned vertically with hole 22. Between knuckles 21 and 23 the edge is formed with a cutout 25. As best shown in FIG. 4, below cutout 25 is a lateral extension 26 and on the outer end of extension 26 is a third knuckle 27 formed with a hole 28 which is offset outwardly relative to the holes 24 and 22. The first-shaped pieces 16, 16 shown in FIGS. 4–6 are identical except that one is inverted relative to the other. In order to connect the ends 19 a staple 41 having two spaced parallel legs 42, 43 and a connector 44 at one end thereof is inserted through the aligned holes in the knuckles. The free lower ends of the legs 42, 43 are then driven into the soil to hold the device in place.

At the second or short end 29 of each first-shaped piece 16 is a first knuckle 31 having a hole 32, a second knuckle 33 on the opposite edge thereof having a hole 34, an extension 36 therebetween having a third knuckle 37 at its outer end formed with a hole 38 and a cutout 39 positioned to receive the third knuckle 37 of the companion or mating piece.

Second-shaped piece 46 is substantially similar to first-shaped piece 16 except that the positions of the various knuckles is reversed and such knuckles are designated by the same reference numerals as in the first-shaped piece followed by the subscript a.

Figure 7:
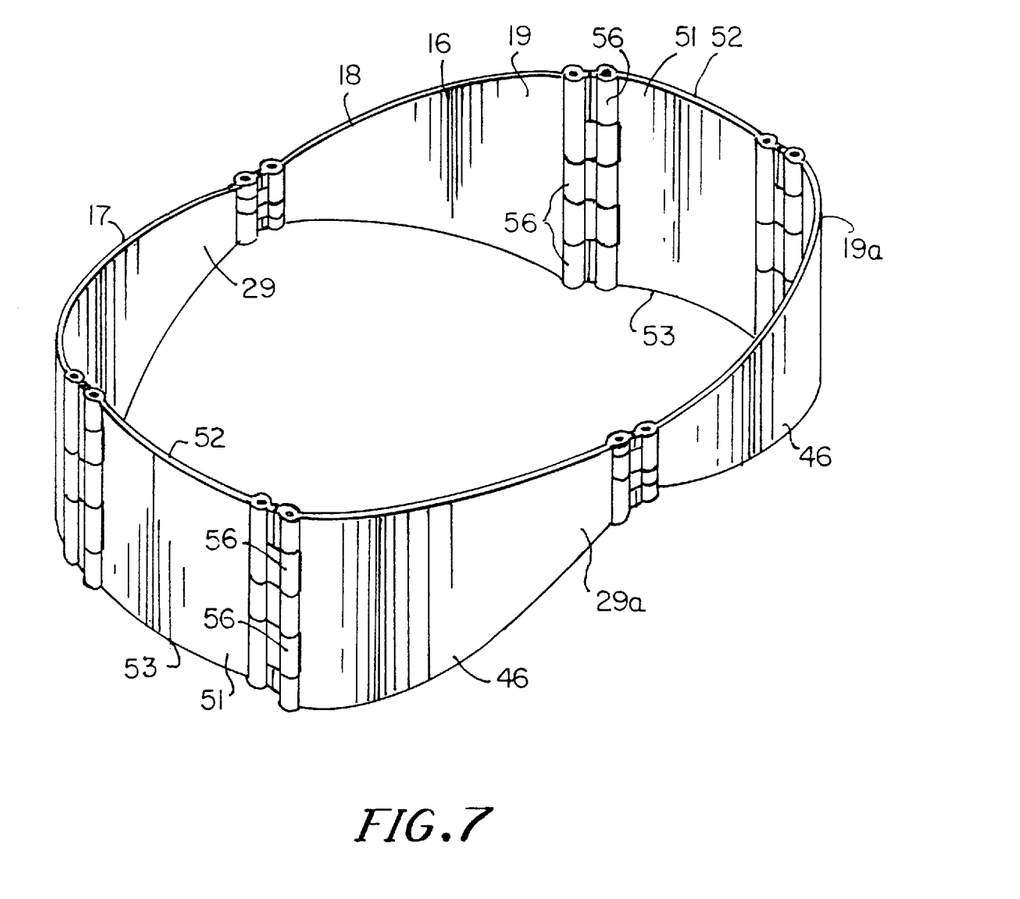
FIG. 7 is a view similar to FIG. 2 showing extra parts interposed to increase the circumference of the retainer.

Directing attention to FIG. 7, in order to expand the circumference of the device and to accommodate larger plants, extender pieces 51 are inserted between the long ends 19 and 19a. Extender pieces 51 are provided with parallel first and second edges 52, 53, respectively. The extender pieces 51 are also provided with knuckles 56 which interfit with the knuckles of the abutting edges of first-shaped pieces 16 or second-shaped pieces 46 as required. It will be understood that the extender pieces 51 may also be inserted between the second or short ends 29, 29a of pieces 16 and 46. As the size of plant 11 requires, one, two, or more extenders may be used.

Figure 8:
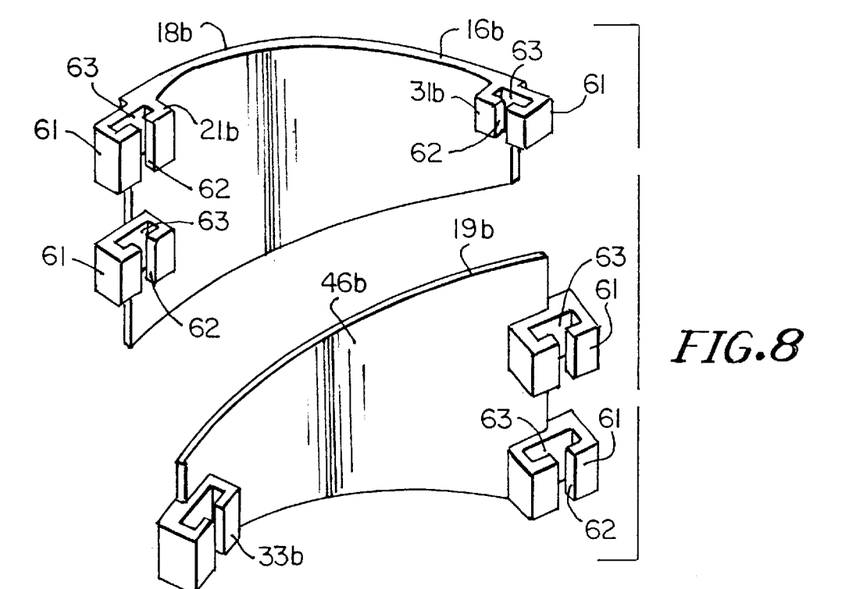
FIG. 8 is a perspective view showing two complementary modified parts.
Figure 9:
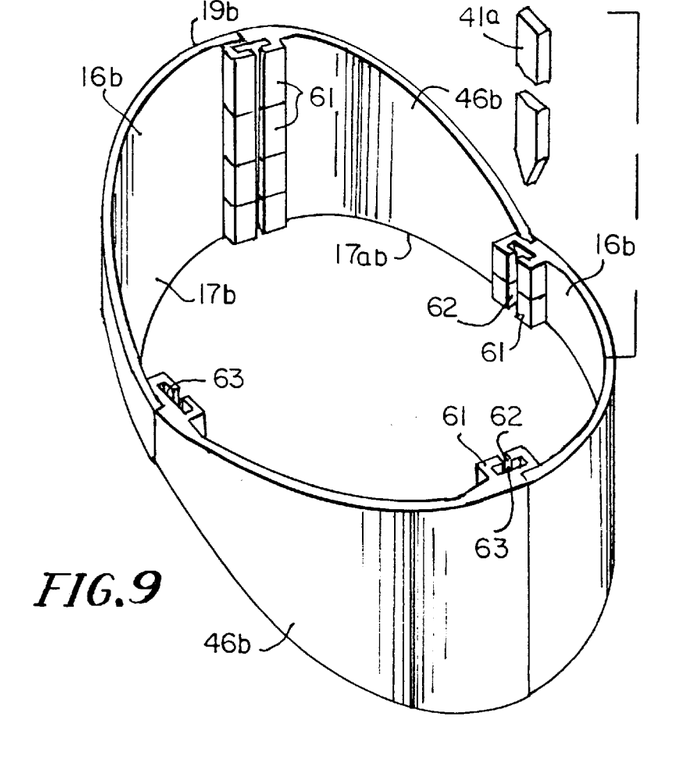
FIG. 9 is a view similar to FIG. 2 showing the parts of FIG. 8 assembled.

Directing attention to FIGS. 8 and 9, instead of leaf hinge knuckles, the ends of first-shaped and second-shaped pieces 16b and 46b are provided with preferably integral members 61 which are rectangular when viewed vertically with a split 62 on the inner side of each member 61. There are rectangular holes 63 in each member 61 which may receive a rectangular stake (not shown) to hold the pieces assembled and, when the stake is driven into the ground, to hold the device in position. The members 61 are functionally similar to the knuckles of the preceding modifications and the same reference numerals, followed by the subscript b, are used to designate corresponding parts.

Figures 10, 11:
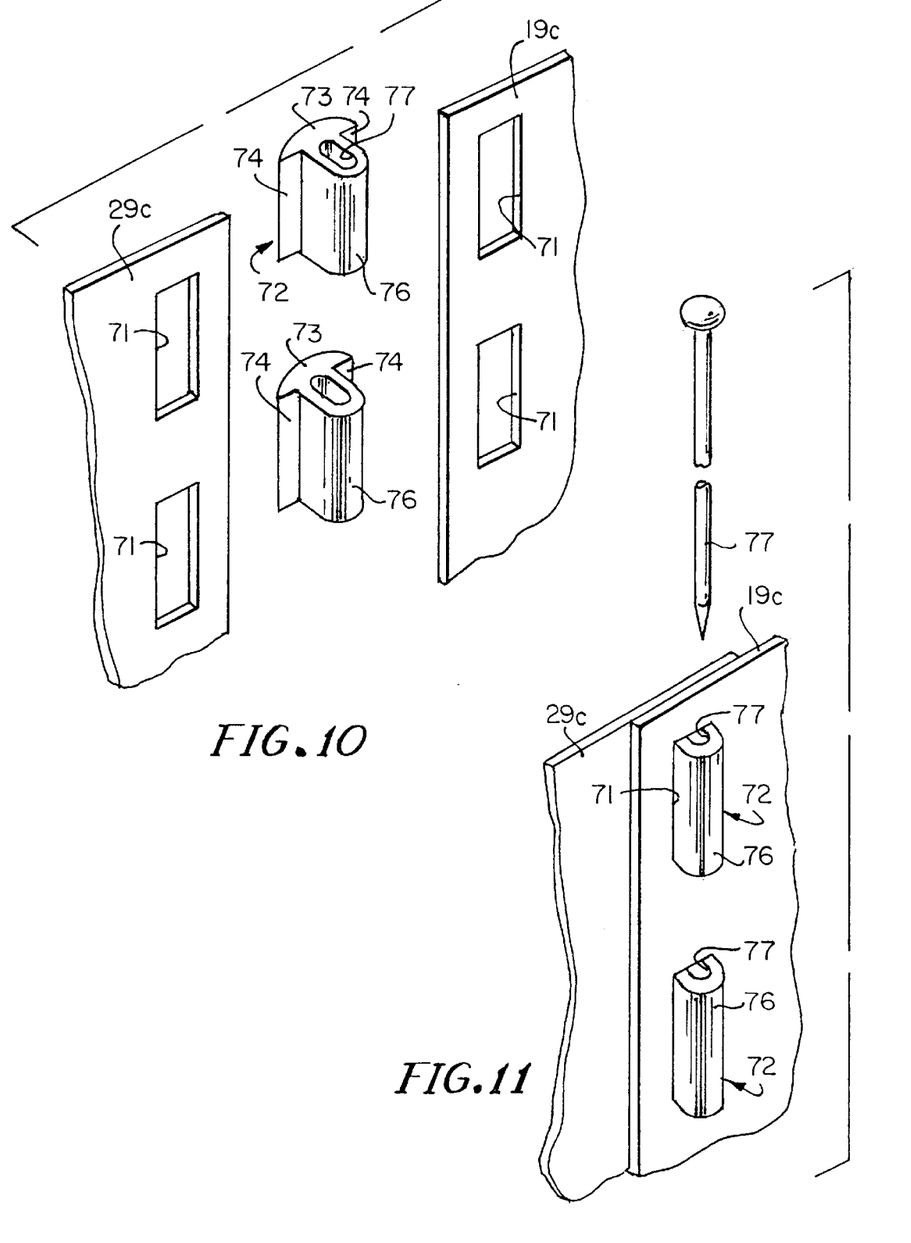
FIG. 10 is an enlarged fragmentary perspective view of a further modification.
FIG. 11 illustrates a step prior to final assembly of the structure of FIG. 10.
Figure 12:
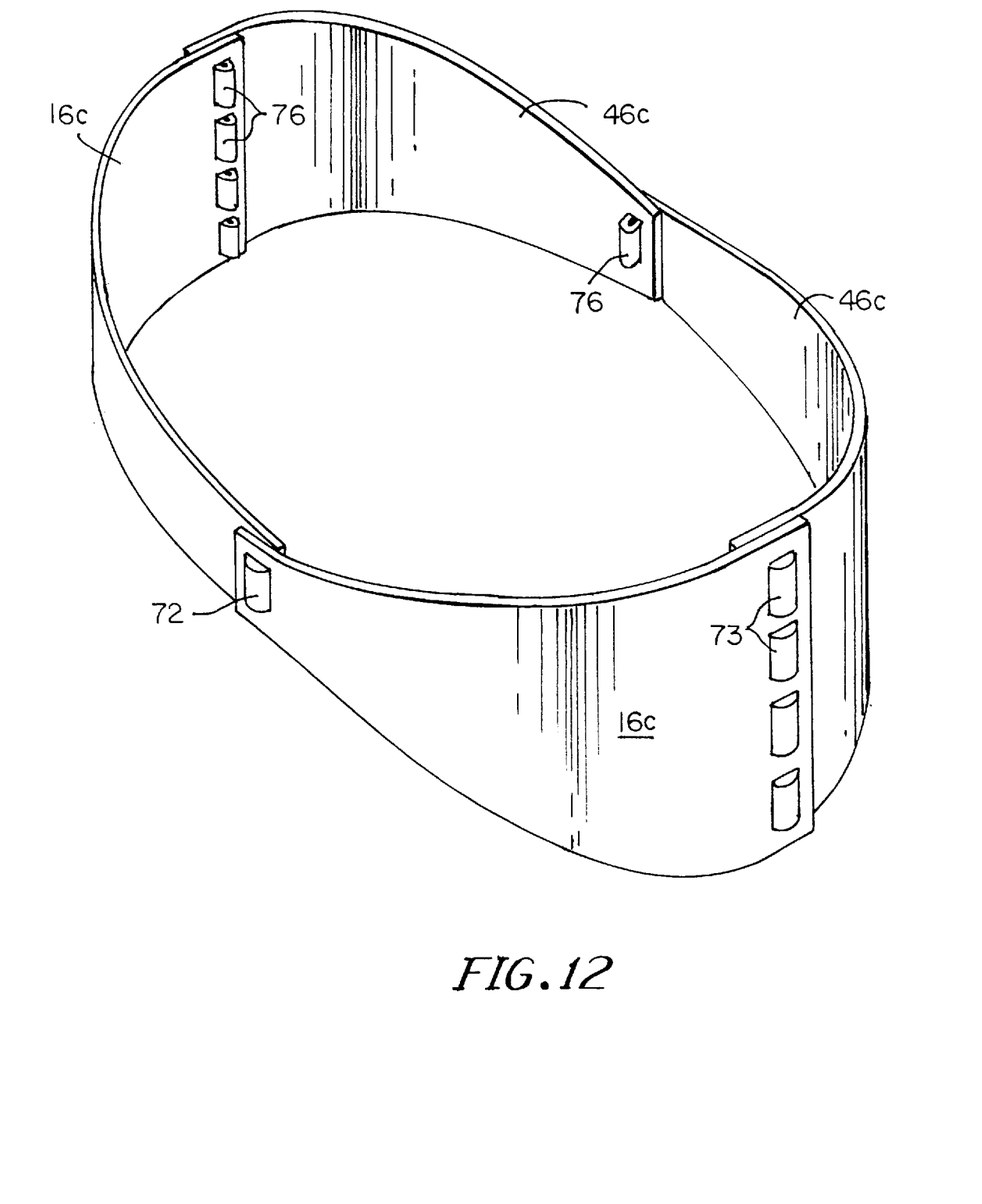
FIG. 12 is a view similar to FIG. 9 of the modification of FIGS. 10 and 11.

Referring now to FIGS. 10–12, spaced inwardly from each end 19c, 29c is a plurality of vertically elongated slots 71, here shown as two in number. Preferably slots 71 are rectangular.

Connectors 72 are provided each having an outer portion, preferably having a rounded outer surface 73 and a pair of vertical flat edges 74. Between the edges 74 is a protrusion 76 which has a thickness slightly less than the width of slots 71. A throughgoing hole 77 is formed in each protrusion 76. The ends of pieces 29c and 19 c are overlapped so that the slots 71 therein are aligned. Thereupon connectors 72 are inserted from the outside, the protrusions 76 extending through both overlapped slots 71 into the inside. A pin 79 is then inserted through the aligned holes 77 of two connectors 72 and, preferably, is driven into the ground to retain the device in place.

It will be understood that the number of slots 71 and their shapes and the number of connectors 72 and their shapes is subject to considerable variation. In other respects the modification of FIGS. 10–12 resembles the previous modification, and the same reference numerals followed by subscript c are used to designate parts similar to preceding modifications. It will further be understood that extenders (not shown but similar in function to extenders 51) may be employed in the modification of FIG. 12.

Figure 13:
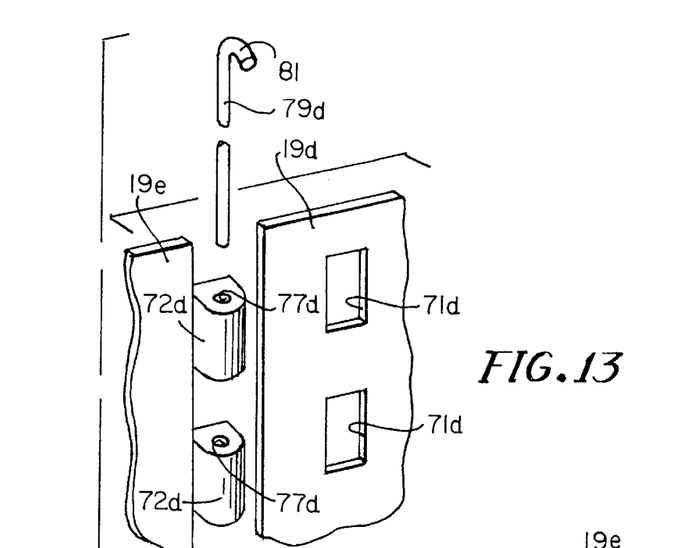
FIG. 13 is a view similar to FIG. 10 of another modification.
Figure 14:
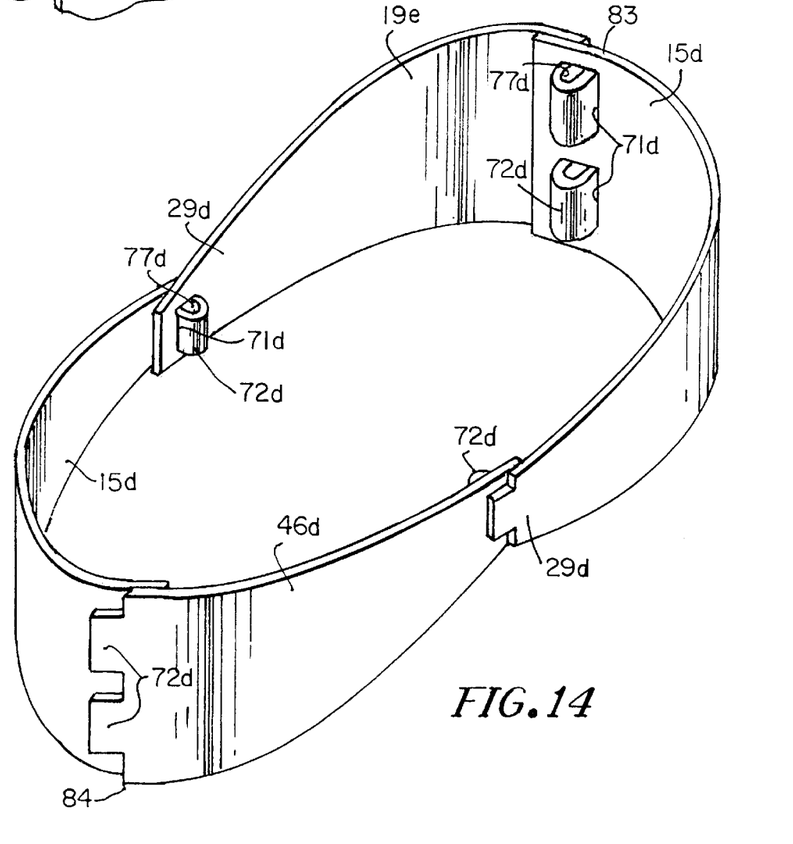
FIG. 14 is a view similar to FIG. 11 of the modification of FIG. 13.

Referring to FIGS. 13–14, connectors 72d are formed integral with pieces 15d, 15e, 46d and 46e. Each connector 42d is inserted through a hole 71d and held in place by a pin 79d fitting through a hole 77d in the protrusion 76 d. Pin 79d is formed with an end 81 bent at a 90° angle and used to drive the pin into the ground.

As illustrated, piece 15d is formed with two holes 71d at its first end 19d and with a protrusion 72d at its second end 29d. Piece 46d is formed with two protrusions 72d at its first end 19e and a hole 71d at its second end 29e. By interfitting the protrusions in the holes as illustrated in FIG. 14 and then inserting pins 79d in the holes 77d in protrusions 76d, the parts are held assembled. Pins 79d are driven into the soil by hammering on ends 81. It will be seen that there is a high point 83 which is located on the uphill side of the assembly and a low point 84 located on the downhill side.

The foregoing descriptions of a specific embodiment of the present invention have been presented for purposes of illustration and description. They are not intended to be exhaustive or to limit the invention to the precise forms disclosed, and obviously many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A soil retainer comprising a pair of first-shaped pieces, a pair of second-shaped pieces, each said piece have vertical first and second ends, a straight edge perpendicular to said ends, a slanted edge slanted relative to said straight edge, said first end being shorter than said second end one piece of each pair of pieces being inverted relative to the other piece of said pair, first attachments on first ends of said first-shaped pieces being mutually engageable, second attachments on first ends of said second-shaped pieces being mutually engageable with said first attachments, third attachments on second ends of said first-shaped pieces, fourth attachments on said second ends of said second-shaped pieces, said third and fourth attachments being mutually engageable, said attachments, when engaged, shaping said retainer into a straight cylinder extending high on a first side and low on a second side opposite said first side.

2. A retainer according to claim 1 which further comprises pin-like members extending through aligned vertical holes in said attachments.

3. A retainer according to claim 2 in which said pin-like members are elongated to extend out of said retainer and being adapted to be driven into the soil.

4. A retainer according to claim 1 which further comprises an extender piece having substantially parallel edges interposed between a first-shaped piece and a second-shaped piece to enlarge the circumference of said retainer, said extender piece having fifth attachments mutually engageable with said third attachments and sixth attachments mutually engageable with said fourth attachments.

5. A retainer according to claim 1 in which said attachments comprise at least one hole formed in each said piece adjacent each said end of said piece, two said holes being aligned when said ends of said pieces are overlapped, and a plurality of connectors, each said connector having an enlarged outer end larger than said holes and a protrusion shaped to fit through holes of overlapped ends of pieces.

6. A retainer according to claim 5 in which each said protrusion is formed with a vertical hole and which further comprises a pin fitting through said hole in said protrusion.

7. A retainer according to claim 1 in which each end of each said piece is formed with at least one knuckle formed with a vertical hole and which further comprises a pin fitting through holes of adjacent knuckles, said knuckles and said pin comprising attachment means.

8. A retainer according to claim 7 in which some of said knuckles are offset relative to other said knuckles and the axes of said holes comprise two parallel lines, said pin comprising a staple having two parallel legs, one leg lying on one said axis and the other said leg lying on the other said axis.

9. A retainer according to claim 7 in which said pin is longer than the end in which it fits, whereby said pin may be driven into the soil.

10. A retainer according to claim 1 in which each end of each said piece is formed with at least one member on an inner surface of said piece, said member being located partly on said piece and having a horizontal extension beyond an end of said piece, said member being formed with a vertical hole, said hole being partially in said extension.

11. A retainer according to claim 10 in which said members on abutting pieces are at different elevations and said members of said abutting pieces interfit.

12. A retainer according to claim 10 in which one said end has at least two said members and another said end has at least one said member, said two said members being separated by a vertical gap of a width approximately equal to the height of said at least one said member.

13. A retainer according to claim 1 in which said attachments comprise at least one hole formed at a first end of one said piece and at least one connector integral with said one said piece at a second end of said piece, said connector comprising a protrusion shaped complementary to said hole to fit through said hole.

14. A retainer according to claim 13 in which said protrusion is apertured and which further comprises a pin shaped to fit through said aperture.

15. A retainer according to claim 13 in which said attachments further comprise at least one second hole formed at a first end of a second said piece and at least one second connector integral with said second said piece, said second connector comprising a protrusion shaped complementary to said second hole to fit through said second hole.

\* \* \* \* \*